United States Patent
Roy et al.

(10) Patent No.: US 12,218,711 B2
(45) Date of Patent: Feb. 4, 2025

(54) METHODS AND DEVICES FOR SIGNAL DETECTION AND CHANNEL ESTIMATION, AND ASSOCIATED COMPUTER PROGRAM

(71) Applicant: FONDATION B-COM, Cesson-sévigné (FR)

(72) Inventors: Matthieu Roy, Romagne (FR); Stéphane Paquelet, Rennes (FR)

(73) Assignee: FONDATION B-COM, Cesson Sévigné (FR)

( * ) Notice: Subject to any disclaimer, the term of this patent is extended or adjusted under 35 U.S.C. 154(b) by 0 days.

(21) Appl. No.: 18/026,984

(22) PCT Filed: Sep. 21, 2021

(86) PCT No.: PCT/EP2021/075966
§ 371 (c)(1),
(2) Date: Mar. 17, 2023

(87) PCT Pub. No.: WO2022/063789
PCT Pub. Date: Mar. 31, 2022

(65) Prior Publication Data
US 2023/0344531 A1 Oct. 26, 2023

(30) Foreign Application Priority Data
Sep. 22, 2020 (FR) ...................................... 2009577

(51) Int. Cl.
*H04B 1/20* (2006.01)
*H04B 17/309* (2015.01)
*H04L 25/02* (2006.01)

(52) U.S. Cl.
CPC ............. *H04B 17/309* (2015.01); *H04B 1/20* (2013.01); *H04L 25/0212* (2013.01)

(58) Field of Classification Search
CPC .............. H04B 17/309; H04L 25/0212; H04L 25/0202
See application file for complete search history.

(56) References Cited

U.S. PATENT DOCUMENTS 9,755,714 B2   9/2017  Bose et al.
2004/0078196 A1  4/2004  Abe et al.
(Continued)

OTHER PUBLICATIONS

Hwanjin Kim and Junil Choi, "Channel AoA Estimation for Massive MIMO Systems Using One-Bit ADCs", Journal of Communications and Networks, vol. 20, No. 4, Aug. 2018 (Year: 2018).*
(Continued)

*Primary Examiner* — Aristocratis Fotakis
(74) *Attorney, Agent, or Firm* — NIXON & VANDERHYE

(57) ABSTRACT

A method for detecting (DET) a signal in a communication system including a plurality of communication channels, from a plurality of noisy values respectively representative of the transmission through the communication channels, is provided. The propagation in the communication channels is characterized by at least one variable. The set of values that can be taken by the variable is divided into a plurality of ranges. The method includes receiving (E4) the signals respectively transmitted in the plurality of communication channels, and detecting (E20) a signal corresponding to a value of the variable lying within one of the plurality of ranges by comparing, with a predetermined threshold, a value taken by a correlator linked to the range in question and calculated as a function of the noisy values. A channel estimation method, a detection device, a channel estimation device and a computer program are also described.

19 Claims, 5 Drawing Sheets

(56) References Cited

U.S. PATENT DOCUMENTS

Figure 1:
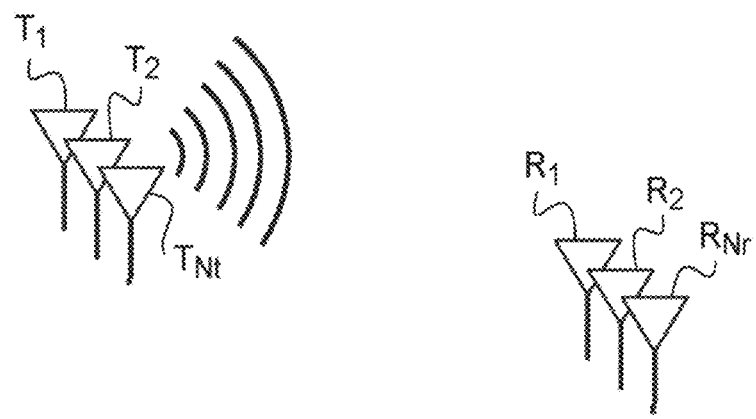

| | | | | |
|---|---|---|---|---|
| 2008/0130794 A1* | 6/2008 | Chong | ............... | G01S 5/0221 |
| | | | | 375/317 |
| 2011/0124359 A1* | 5/2011 | Shimomura | ........ | H04L 27/2675 |
| | | | | 455/507 |
| 2019/0132156 A1* | 5/2019 | Wang | ................... | H04L 25/024 |
| 2019/0289568 A1* | 9/2019 | Pajovic | ............. | H04W 64/003 |
| 2021/0314197 A1* | 10/2021 | Ding | ................... | H04B 17/336 |

OTHER PUBLICATIONS

Yue Dong, Chen Chen, and Ye Jin, AoAs and AoDs Estimation for Sparse Millimeter Wave Channels with One-bit ADCs, State Key Laboratory of Advanced Optical Communication Systems and Networks, IEEE, 2016 (Year: 2016).*

Fangqing Liu, Heng Zhu, Jian Li, Pu Wang, Philip V. Orlik, Massive MIMO Channel Estimation Using Signed Measurements with Antenna-Varying Thresholds, 2018 IEEE Statistical Signal Processing Workshop (SSP) (Year: 2018).*

Jiguang He, Markus Leinonen, Henk Wymeersch, Markku Juntti, Channel Estimation for RIS-Aided mmWave MIMO Channels, Feb. 2020, IEEE (Year: 2020).*

Junho LEE, et al., "Exploiting Spatial Sparsity for Estimating Channels of Hybrid MIMO Systems in Millimeter Wave Communications", Globecom 2014—Signal Processing for Communications Symposium, IEEE, 2014, pp. 3326-3331 (6 pages).

Lorenz Weiland, et al., "OMP with Grid-less Refinement Steps for Compressive mmWave MIMO Channel Estimation", 2018 IEEE 10th Sensor Array and Multichannel Signal Processing Workshop (SAM), IEEE, Jul. 8, 2018, pp. 543-547 (5 pages).

International Search Report for PCT/EP2021/075966 dated Dec. 21, 2021, 6 pages.

Written Opinion of the ISA for PCT/EP2021/075966 dated Dec. 21, 2021, 7 pages.

* cited by examiner

METHODS AND DEVICES FOR SIGNAL DETECTION AND CHANNEL ESTIMATION, AND ASSOCIATED COMPUTER PROGRAM

CROSS-REFERENCE TO RELATED APPLICATIONS

This application is the U.S. national phase of International Application No. PCT/EP2021/075966 filed Sep. 21, 2021 which designated the U.S. and claims priority to FR Patent Application No. 2009577 filed Sep. 22, 2020, the entire contents of each of which are hereby incorporated by reference.

TECHNICAL FIELD OF THE INVENTION

The present invention relates to the technical field of telecommunication.

More particularly, it relates to methods and devices for signal detection and channel estimation, as well as an associated computer program.

STATE OF THE ART

In order to optimize the transmission of data in a communication system, it is known to implement a channel estimation method aiming to have a better knowledge of the current state of the communication channels used by the communication system.

In this context, the article "*OMP with Grid-less Refinement Steps for Compressive mmWave MIMO Channel Estimation*" by L. Weiland, C. Stöckle, M. Würth, T. Weinberger and W. Utschick, 2018 *IEEE 10th Sensor Array and Multichannel Signal Processing Workshop (SAM)*, Sheffield, 2018, pp. 543-547, doi: 10.1109/SAM.2018.8448789, proposes on this topic a method of the OMP ("Orthogonal Matching Pursuit") type making it possible to characterize the propagation channels in the case of a communication system of the MIMO ("Multiple-Input Multiple-Output") type.

DISCLOSURE OF THE INVENTION

In this context, the present invention proposes a method for detecting a signal in a communication system comprising a plurality of communication channels, from a plurality of noisy values respectively representative of the transmission through said communication channels, the propagation in said communication channels being characterized by at least one variable, the set of values that can be taken by said variable being divided into a plurality of ranges, said method comprising the steps of:
receiving signals respectively transmitted in the plurality of communication channels, and
detecting a signal corresponding to a value of said variable included in one range among the plurality of ranges by comparing, with a predetermined threshold, a value taken by a correlator linked to the range in question and calculated as a function of the noisy values.

Thus, the signal detection step is based on the use of a correlator that makes it possible to improve the detection performances in particular as regards the distinction with respect to the level of noise present. Moreover, this step is computationally inexpensive.

Other non-limiting and advantageous features of the detection method according to the invention, taken individually or according to all the technically possible combinations, are the following:
the detection step comprises a step of comparing, with said predetermined threshold, a maximum value among a plurality of values taken by the correlator;
the detection step comprises a step of determining, for each range, a sum of windowed correlator functions associated with the range in question and depending upon said noisy values;
the detection step comprises a step of comparing the sum of windowed correlator functions with said predetermined threshold; and
the predetermined threshold depends upon a level of noise associated with the range in question.

The invention also relates to a method for channel estimation in a communication system comprising a plurality of communication channels, from a plurality of noisy values respectively representative of the transmission through said communication channels, said method comprising the steps of:
detecting a signal by implementing a detection method as defined hereinabove, and
estimating the value of the variable in the range including the value of said variable corresponding to the detected signal.

The invention also relates to a method for channel estimation in a communication system comprising a plurality of communication channels, from a plurality of noisy values respectively representative of the transmission through said communication channels, said method comprising, as long as a stop condition is not obtained, the repetition of steps of:
detecting a signal by implementing a detection method as defined hereinabove, and
estimating the value of the variable in the range including the value of said variable corresponding to the detected signal,
said stop condition corresponding to the absence of detection of a signal when the detection method as defined hereinabove is implemented.

This channel estimation method has for advantage that it is based on calculations that have already been performed during the detection method introduced hereinabove. This also allows reducing the cost of execution of this estimation method.

Other non-limiting and advantageous features of the estimation method according to the invention, taken individually or according to all the technically possible combinations, are the following:
the estimation step comprises a step of determining an intermediate value of said variable as equal to the center of the range including the value of said variable corresponding to the detected signal;
the estimation step comprises a step of determining an intermediate value of said variable by comparing windowed correlators corresponding to the range including the value of said variable corresponding to the detected signal;
the estimation step further comprises a step of determining a function having a property of convexity associated with a scalar product of a vector formed of the noisy values and a steering vector depending upon said variable, the maximum of said function having a property of convexity and the maximum of said scalar product being obtained for the same value of said variable; and said value of the variable is determined by an optimization step on the basis of said intermediate value of the variable and using said function having a property of convexity.

The invention also relates to a device for detecting a signal in a communication system comprising a plurality of communication channels, from a plurality of noisy values respectively representative of the transmission through said communication channels, the propagation in said communication channels being characterized by at least one variable, the set of values that can be taken by said variable being divided into a plurality of ranges, said detection device comprising:

a module for receiving the signals respectively transmitted in the plurality of communication channels, and a module for detecting a signal corresponding to a value of said variable included in one range among the plurality of ranges by comparing, with a predetermined threshold, a value taken by a correlator linked to the range in question and calculated as a function of the noisy values.

The invention also relates to a device for channel estimation in a communication system comprising a plurality of communication channels, from a plurality of noisy values respectively representative of the transmission through said communication channels, said channel estimation device comprising:

a device for detecting a signal as defined hereinabove, and a module for estimating the value of the variable in the range including the value of said variable corresponding to the detected signal.

The invention also relates to a device for channel estimation in a communication system comprising a plurality of communication channels, from a plurality of noisy values respectively representative of the transmission via said communication channels, said channel estimation device being designed to activate, as long as a stop condition is not obtained:

a detection device for detecting a signal by implementation of a detection method as defined hereinabove, and a module for estimating the value of the variable in the range including the value of said variable corresponding to the detected signal, said stop condition corresponding to the absence of detection of a signal by the detection device as defined hereinabove.

The invention finally proposes a computer program comprising instructions executable by a processor and adapted to implement a method as proposed hereinabove when these instructions are executed by the processor.

Of course, the different features, alternatives and embodiments of the invention can be associated with each other according to various combinations, insofar as they are not mutually incompatible or exclusive.

DETAILED DESCRIPTION OF THE INVENTION

Figure 2:
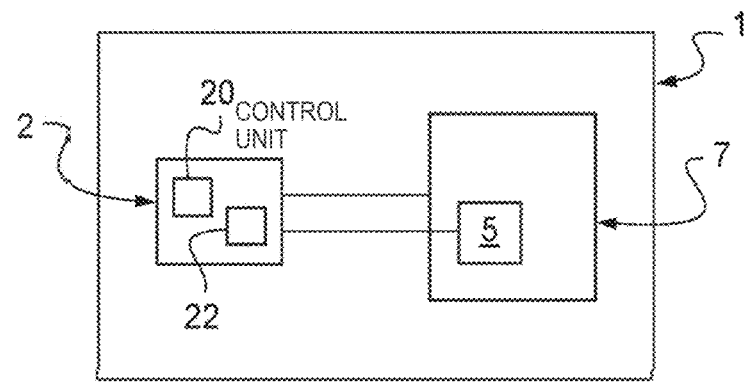
Figure 3:
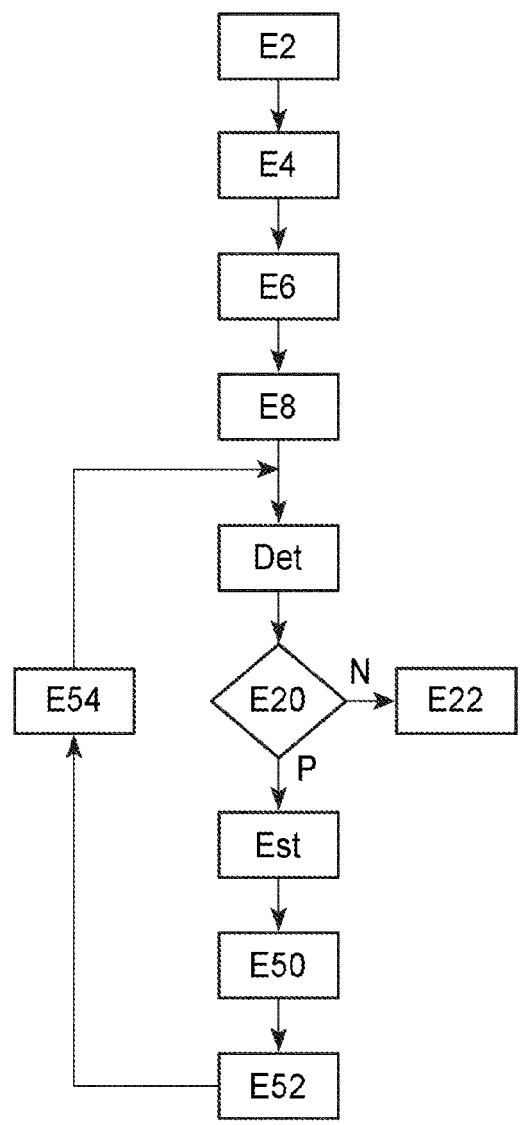
Figure 4:
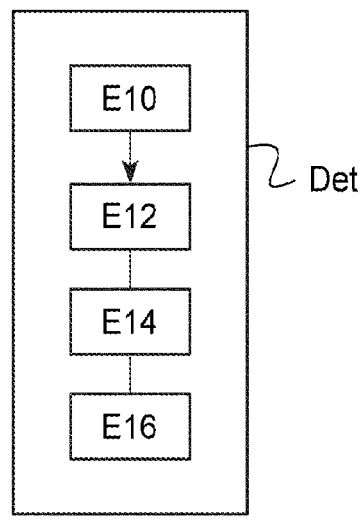
Figure 5:
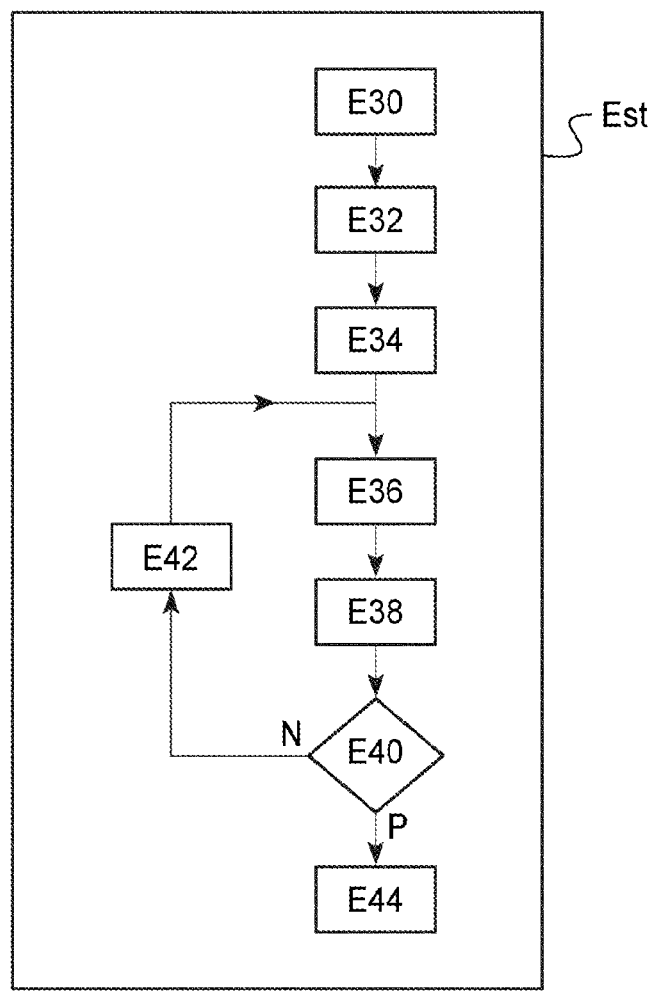
Figure 6:
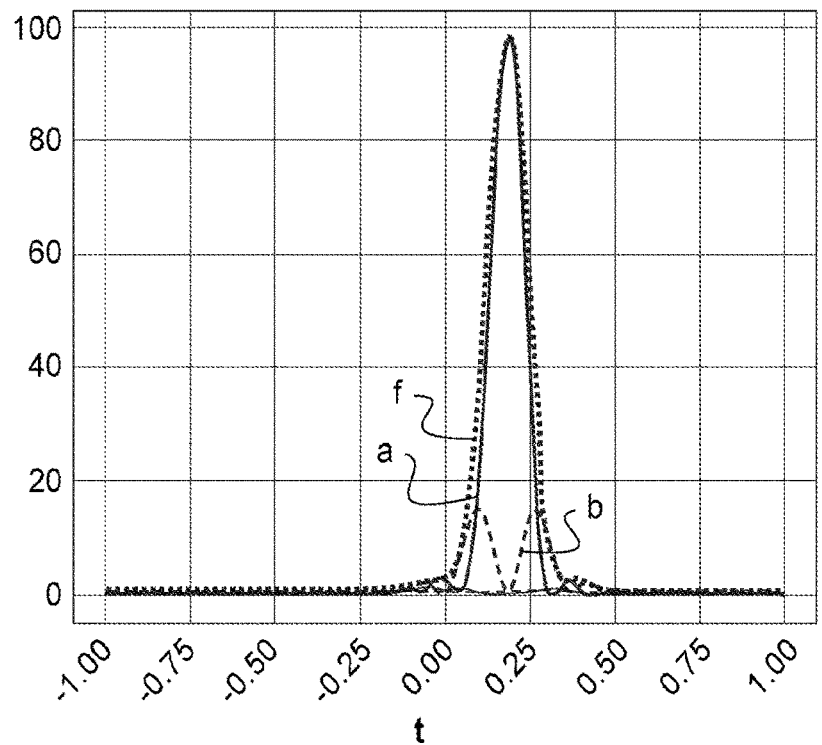
Figure 7:
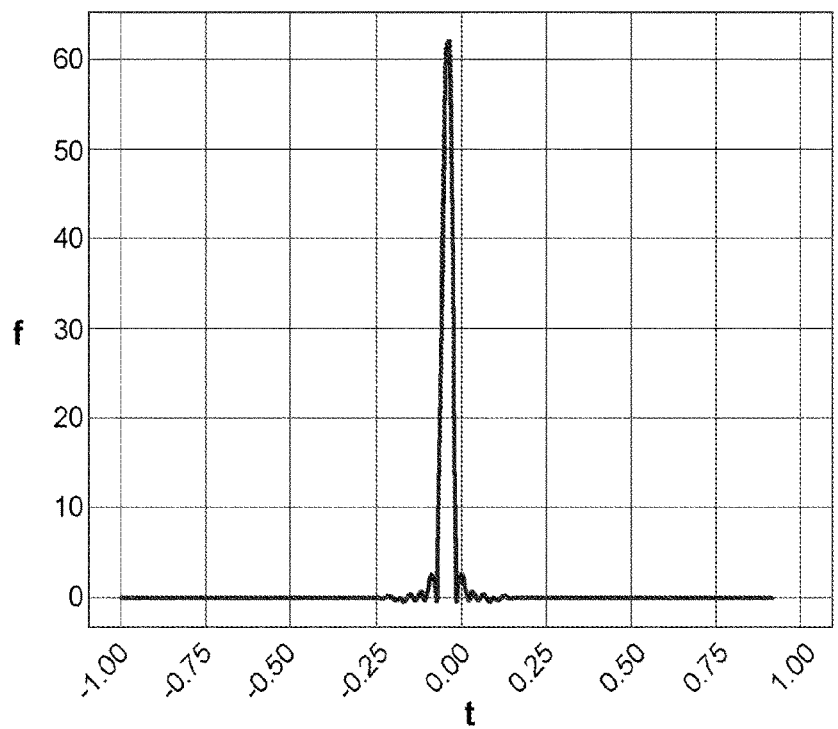
Figure 8:
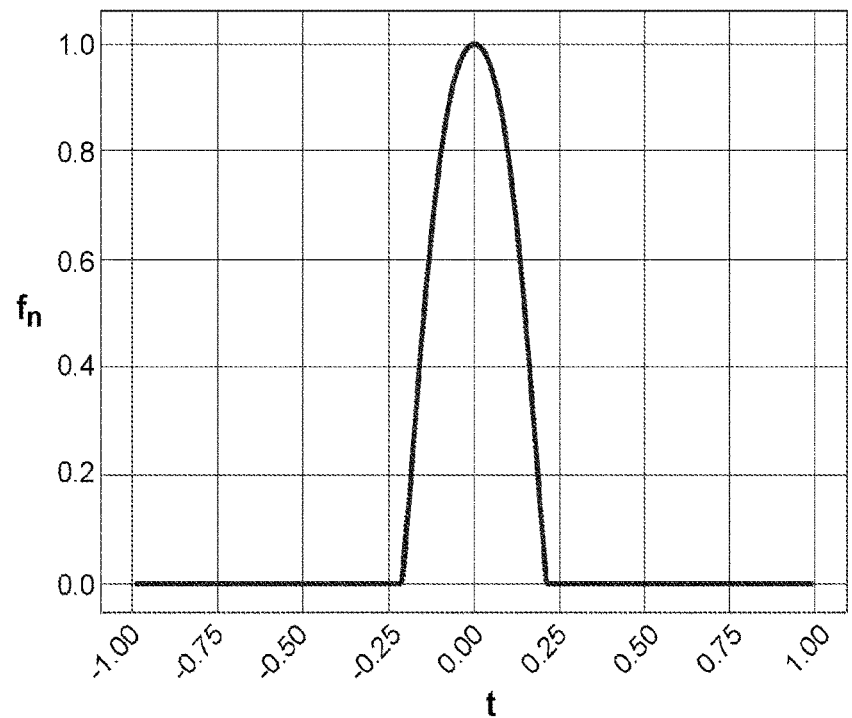
Figure 9:
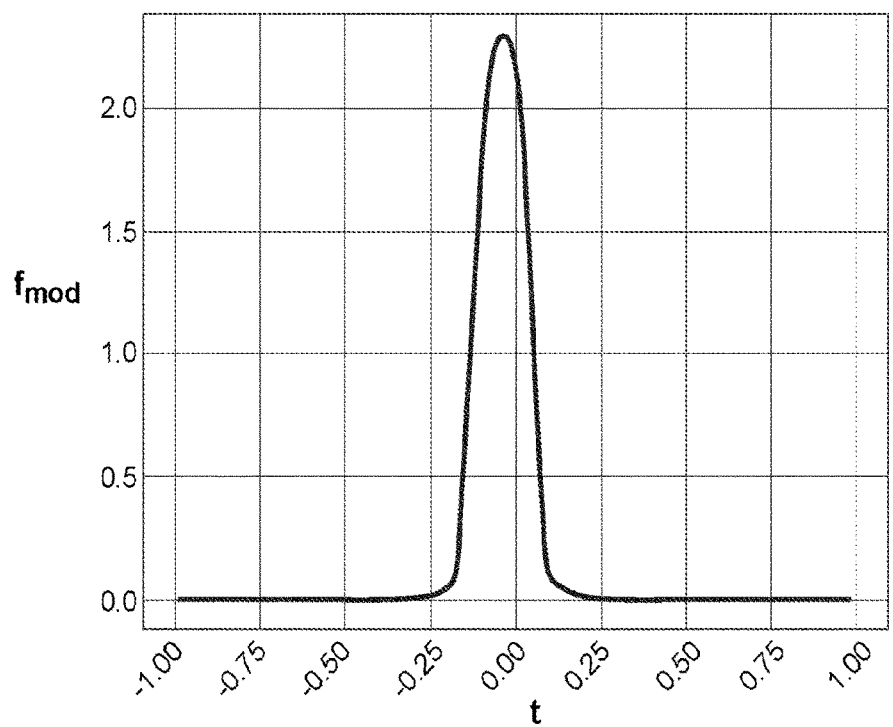

Moreover, various other features of the invention will be apparent from the appended description made with reference to the drawings that illustrate non-limiting embodiments of the invention, and wherein:

FIG. 1 shows a telecommunication system involved in the present invention,

FIG. 2 shows a channel estimation device for implementing a channel estimation method according to the invention, FIG. 3 shows, as a flowchart, an example of channel estimation method according to the invention, FIG. 4 shows, as a flowchart, an example of detection method as it can be implemented within the channel estimation method shown in FIG. 3, FIG. 5 shows, as a flowchart, an example of estimation method as it can be implemented within the channel estimation method shown in FIG. 3, FIG. 6 shows the evolution of a test function used within the estimation method shown in FIG. 5, FIG. 7 shows the shape of a correlator according to the invention, FIG. 8 shows the shape of a convolution kernel used within the estimation method shown in FIG. 5, and FIG. 9 shows the shape of a modified function obtained during the implementation of the estimation method shown in FIG. 5.

FIG. 1 shows a telecommunication system comprising a set of Nt transmitting antennas $T_1, \ldots, T_{Nt}$ and a set of Nr receiving antennas $R_1, \ldots, R_{Nr}$.

Each of the transmitting antennas $T_1, \ldots, T_{Nt}$ transmits electromagnetic signals (generally representing data to be transmitted, encoded by symbols) in an associated communication channel C, where these signals are received by the different receiving antennas $R_1, \ldots, R_{Nr}$.

In the example described herein, the set of transmitting antennas $T_1, \ldots, T_{Nt}$ is a Uniform Linear Array (ULA). The transmission of the electromagnetic signals between the transmitting antennas $T_1, \ldots, T_{Nt}$ and the receiving antennas $R_1, \ldots, R_{Nr}$ is here physically modeled by a flat wave propagated (in direct line) along a defined direction between the centroid of the transmitting antennas $T_1, \ldots, T_{Nt}$ and the centroid of the receiving antennas $R_1, \ldots, R_{Nr}$.

This situation corresponds in particular to the case of the so-called MIMO ("Multiple-Input Multiple-Output") systems that comprise a plurality of transmitting antennas $T_1, \ldots, T_{Nt}$ and a plurality of receiving antennas $R_1, \ldots, R_{Nr}$.

In this context of the MIMO systems, the propagation of the signals in the communication channels can be characterized by an angle of departure $\theta_{tx}$, an angle of arrival $\theta_{rx}$, and a delay of propagation T between the plurality of transmitting antennas $T_1, \ldots, T_{Nt}$ and the plurality of receiving antennas $R_1, \ldots, R_{Nr}$.

The present invention takes place in a context of multipath communication channel (for example, here, P paths) between the transmitting antennas $T_1, \ldots, T_{Nt}$ and the receiving antennas $R_1, \ldots, R_{Nr}$.

The received signals y are written as:

$$y = X_t^T h + n$$

with $X_t$ the vector of the transmitted signals, $\theta_{tx}$ the angle of departure, n a vector characterizing a thermal noise and the notation T corresponding to the matrix transposition operator.

In this case, the communication channel C is modeled by the vector h expressed as:

$$h = \sum_{p=1}^{P} \beta_p e_t(t_p)$$

where $e_t$ is the steering vector characteristic of the antenna array, $\beta_p$ the gain of the electromagnetic signals and $t_p$ the variable defined by $t_p = \cos(\theta_{tx})$.

In an extended version of the MIMO model, the vector h modeling the propagation channel is expressed as:

$$h = \sum_{p=1}^{P} \beta_p e_r(r_p) \otimes e_t^*(t_p) \otimes e_f(\tau_p)$$

with $e_t$, $e_r$ and $e_f$ the steering vectors associated with the directions t, r and T, respectively, the variables t=cos $(\theta_{tx})$, r=cos $(\theta_{rx})$, T the delay of propagation and $\otimes$ the Kronecker product.

The propagation channels are hence characterized using these three variables. The object of the present invention is to determine them. The following disclosure describes the determination of one of these variables, for example, the angle of departure $\theta_{tx}$, by considering a modeling according to only one of the three variables. As an alternative, a two-variable or three-variable modeling can be used.

FIG. 2 functionally illustrates a channel estimation device 1 according to an exemplary embodiment of the invention.

This channel estimation device 1 comprises a control unit 2. The control unit 2 also comprises a detection device 5 and an estimation device 7.

The control unit 2 comprises a processor 20 and a memory 22.

The detection device 5 and the estimation device 7 are formed by a set of functional modules. For example, the detection device 5 comprises a signal reception module and a signal detection module. The estimation device 7 comprises the detection device 5 and an estimation module.

Each of the different modules described is for example implemented by means of computer program instructions adapted to implement the module in question when these instructions are executed by the processor of the control unit 2.

The memory of the control unit 2 is for example adapted to memorize for example pilot signals, here linear signals, used to test the communication channels.

FIG. 3 is a flowchart showing an example of channel estimation method that can be implemented in the context described hereinabove.

As shown in FIG. 3, the channel estimation method starts with step E2, during which the transmitting antennas $T_1, \ldots, T_{Nt}$ transmit electromagnetic signals $X_t$ to the receiving antennas $R_1, \ldots, R_{Nr}$.

At step E4, the signals y are received by the receiving antennas $R_1, \ldots, R_{Nr}$. These signals are transmitted in the plurality of communication channels. These received signals y are given by the expression introduced hereinabove.

The channel estimation method then continues with step E6. During this step, the control unit 2 determines noisy values z. These noisy values z are function of the transmitted signals $X_t$ and the received signals y. They are representative of the transmission of the signals through the communication channels. On the other hand, these noisy values z are calculated without the use of the pilot signals. They are expressed for example according to the formula:

$$z = X_t^T y$$

with the notation T corresponding to the matrix transposition operator.

These noisy values z will serve as a base for determining the value t associated with the angle of departure $\theta_{tx}$.

In order to estimate the communication channel, the control unit 2 initializes an index i at the value 0 (step E8). This index i denotes the current iteration. During this step, the control unit 2 also initializes the value of a so-called "residue" variable $res_i$ (step E8). This variable $res_i$ is here initialized from the noisy values determined at step E6: $res_0 = z$. Each iteration makes it possible to search for a value taken by this residue $res_i$.

As described hereinabove, the propagation of the signals in the communication channels is characterized by the variable t associated with the angle of departure $\theta_{tx}$, the variable r associated with the angle of arrival $\theta_{rx}$ and the propagation delay T.

The channel estimation method then comprises steps of estimating the values of these variables. In the following, the steps presented describe the determination of the value taken by one of these variables (here the variable t associated with the angle of departure $\theta_{tx}$).

The different steps are applied in the same way for determining the values of the other variables characterizing the propagation of the signals in the communication channels.

To characterize the propagation of the signals in the communication channel, a signal must first be detected in the communication system.

The channel estimation method then comprises a detection method Det of a signal in the communication system. FIG. 4 is a flowchart showing an example of a detection method as it can be implemented within the channel estimation method according to the invention.

As shown in FIG. 4, at step E10, the detection method comprises a step of dividing the range of values that can be taken by the value t into a plurality of sub-ranges, for example $K_t$ sub-ranges j.

By definition, the value t associated with the angle of departure $\theta x$ is between $-1$ and 1. At step E10, the range $[-1, 1]$ is thus divided into a succession of sub-ranges in such a way as to cover the whole range $[-1, 1]$. The number Kt is for example predetermined, before execution of the detection method, for example as a function of a desired level of performance.

The following of the detection method then consists in testing the presence of a signal on each of the sub-ranges constituting the range of values that can be taken by the value t associated with the angle of departure $\theta_{tx}$.

For that purpose, at step E12, the processor of the detection device determines, for each sub-range j, a so-called "correlator" function $f(res_i, j)$. This correlator depends on the noisy values z. More particularly, each correlator associated with the sub-range j in question depends on the current value of the residue $res_i$ (which is equal to the noisy values z during the first iteration, where i=0). It also depends on the steering vector $e_t$ associated with the direction corresponding to the center $t_j$ of the sub-range j.

In practice, this correlator can be interpreted as a spatial filter associated with the sub-range in question, making it possible to filter the signals in order for example to distinguish them from the noise on this sub-range j.

According to an embodiment, the correlator is defined by the following expression:

$$f(res_i, j) = |e_t^T(t_j) \cdot res_i|^2$$

with $t_j$ the center of the sub-range in question, $e_t$ the steering vector associated with the direction corresponding to the center $t_j$ of the sub-range in question, $res_i$ the current value of the residue.

According to another embodiment, on each sub-range, each correlator is defined as a sum of windowed correlator functions associated with the sub-range in question. In this case, it is defined by the following expression:

$$f(res_i, j) = \sum_{k=1}^{N_t} \lambda_k \left| e_t^T(t_j) \cdot (r_{tx,k} \odot res_i) \right|^2 \quad (1)$$

with $e_t$ the steering vector associated with the direction t, $t_j$ the center of the sub-range in question, $res_i$ the current value of the residue, $\lambda_k$ scalars and $r_{tx,k}$ vectors and the notation $\odot$ an operator symbolizing the term-by-term product between the different elements of the vectors in question (also called Hadamard product).

The scalars $\lambda_k$ and the vectors $r_{tx,k}$ correspond respectively to the eigenvalues and eigenvectors associated with the matrix $R_0$ defined by the expression:

$$[R_0]_{k,l} = \operatorname{sinc}\left(2\pi\Delta_t(l-k)\frac{\|\vec{a}_{tx}\|}{\lambda}\right)$$

with $\Delta_t$ the width of the sub-range in question, $\|a_{tx}\|$ the distance between two transmitting antennas, $\lambda$ the wavelength of the transmitted signals and the notation sinc corresponding to the sinc function defined by $\operatorname{sinc}(x)=\sin(x)/x$.

The eigenvalues $\lambda_k$ and the eigenvectors $r_{tx,k}$ depend only on the width $\Delta_t$ of the sub-range j in question. The eigenvalues $\lambda_k$ decrease towards 0.

The expression $$|e_t^T(t_j)\cdot(r_{tx,k}\odot res_i)|^2$$

is herein called "windowed correlator function".

As shown in FIG. 4, the detection method then continues with step E14.

Previously, it is possible to note here that, in the two embodiments described hereinabove, the correlators observe a maximum when the current residue $res_i$ is collinear to the steering vector $e_t$ associated with the direction corresponding to the center $t_j$ of the sub-range j in question.

During this step, the processor of the detection device identifies the sub-range corresponding to the maximum likelihood of the correlator determined at step E12. More precisely, the control unit 2 determines the maximum value reached by the correlators among the correlators determined for each sub-range j.

Once the maximum value of the correlators determined, the processor of the detection device compares this determined maximum value with a predetermined threshold. This predetermined threshold is function of a level of noise associated with the studied range. It is for example here a Gaussian noise distributed in all the directions.

According to the first embodiment described hereinabove, the processor of the detection device therefore here compares with the predetermined threshold the maximum value among each of the correlator values calculated according to the first embodiment introduced earlier.

As an alternative, according to the second embodiment, the processor of the detection device compares, with the predetermined threshold, the maximum sum of windowed correlator functions determined among the different correlator function sums determined for each sub-range j.

In practice here, during this step, the control unit 2 identifies the sub-range on which the power of the transmitted signal is the highest and such that this signal cannot be considered as noise.

If, at step E14, the maximum of likelihood of the correlator (either the maximum value among the correlators according to the first embodiment, or the maximum sum among the windowed correlator function sums determined according to the second embodiment) is higher than the predetermined threshold, the processor of the detection device identifies the sub-range containing the searched value t of the angle of departure (step E16). We hence consider here that a signal has been detected in the communication system.

As shown in FIG. 3, the channel estimation method then continues with step E20. During this step, the control unit 2 receives from the detection device the information about the detection of a signal in the communication system.

In the case where a signal has been detected, the channel estimation method then comprises an estimation method Est (described hereinafter and shown in FIG. 5) for estimating the value associated with the variable characterizing the propagation of the signals in the communication channel; more particularly here, the estimation method relates to the estimation of the value t associated with the angle of departure $\theta_{tx}$ relating to the detected signal.

If, at step E14, the maximum of likelihood of the correlator is lower than the predetermined threshold, it is considered that no signal has been detected. At step E20, the control unit 2 then receives the information that no signal has been detected by the detection device. The channel estimation method then continues with step E22. This absence of detection here forms a stop condition.

When the stop condition has been obtained, the communication channel is characterized on the basis of the set of signals previously detected at the current index i. The vector h is then defined by the following expression:

$$h = \sum_{p=1}^{P} \beta_{p,i-1} e_t(\tau_p)$$

with $\beta_{p,i}$ the gain estimation of the electromagnetic signals associated with the estimation $T_p$ of the value t obtained during the previous iteration of the method (preceding the current index i). We hence have here $P=i-1$. Each parameter $\beta_{p,i}$ has hence been obtained during the previous iterations.

As an alternative, another stop condition can be defined, for example by determining the norm of the residue and by identifying when the latter is lower than a predefined threshold.

FIG. 5 is a flowchart showing an example of estimation method as it can be implemented within the channel estimation method.

In the case where a signal has been detected in the communication system (and hence a sub-range has been identified), the estimation method Est starts at step E30. During this step, the method of the estimation device determines, from the sub-range identified at step E14 of the detection method, a first estimation $t^0$ of the value t of the angle of departure $\theta_{tx}$.

According to an embodiment, this first estimation $t^0$ corresponds to the center $t_j$ of the identified sub-range.

Another embodiment is based on the values of the windowed correlators determined on the identified sub-range. More particularly, the first estimation $t^0$ of the value t of the angle of departure $\theta_{tx}$ is based on a test function $f_t$ determined on each sub-range j and depending of the windowed correlators previously determined:

$$f_t(res_i, j) = \sum_{k=1}^{N_t} \lambda_k |(r_{tx,k} \odot res_i)^T \cdot e_t(t_j)|^2$$

The determination of the first estimation $t^0$ is then based on a comparison of the windowed correlators associated with the sub-range j identified at step E14, hence corresponding to the signal detected during the detection method Det.

FIG. 6 shows the evolution of this test function $f_t$ as a function of the different values possible for the value t of the angle of departure $\theta_{tx}$.

The curve f corresponds to this test function, taking into account all the windowed correlators. The curve a corresponds to the contribution of the first windowed correlator to the function $f_t$. The curve b corresponds to the contribution of the second windowed correlator to the function $f_t$.

This figure thus makes it possible to evaluate the contribution of each windowed correlator in the test function $f_t(res_i, j)$. Studying each of these contributions of each windowed correlator thus makes it possible to evaluate the first estimation $t^0$ of the value t of the angle of departure $\theta_{tx}$. In particular, the phase difference associated with each windowed correlator makes it possible to locate the portion of the sub-range that contains the searched value t (for example, on the left or the right of the sub-range center). The amplitude of each windowed correlator makes it possible to identify the position of the searched value t in the sub-range in question.

In practice, this first estimation $t^0$ of the value t associated with the angle of departure $\theta_{tx}$ corresponds to an approximate estimation of this value.

At this step of the estimation method, we have an approximate estimation of the value t associated with the angle of departure $\theta_{tx}$ (we also know, thanks to the implementation of the method of detection of the sub-range in which is located this value t).

The following steps of the estimation method therefore have for object to refine this first estimation $t^0$.

A conventional solution consists in using optimizing methods such as the Newton-Raphson method or the gradient descent. However, these methods are based on the use of functions having properties of convexity.

Here, the studied function (previously called correlator) defined by $$f(res_i, t) = |e_t^T(t) \cdot res_i|^2$$

has a behavior similar to a Dirac function near its maximum (FIG. 7). Conventional optimization methods are not suitable for processing this type of function. It is hence necessary in a first time to modify the correlator so as to then be able to apply thereto the conventional optimization methods.

The estimation method thus continues with step E32 during which the processor of the estimation device determines a modified function $f_{mod\_i}$. This modified function $f_{mod\_i}$ is determined on the basis of a scalar product between the vector associated with the noisy values and the steering vector. More precisely, here, the vector associated with the noisy values z here corresponds to the vector associated with the current value of the residue $res_i$.

The modified function $f_{mod\_i}$ has properties of convexity, that is to say that this modified function $f_{mod\_i}$ is either convex, or concave. These properties will hence allow implementing the conventional optimization methods.

Moreover, this modified function $f_{mod\_i}$ reaches a maximum value for the value t corresponding to the maximum of the initial correlator (that is to say the non-modified shape).

In practice here, the determination of this modified function $f_{mod\_i}$ amounts to determine the result of a convolution operation between the correlator $|e_t^T(t) \cdot res_i|^2$ and a so-called "convolution kernel" function $f_n$. This convolution kernel $f_n$ here has for example the shape of a section of parabola (FIG. 8).

The modified function $f_{mod\_i}$, to which will be applied the optimization method, here depends on a sum of windowed correlators (as introduced during the detection method):

$$f_{mod\_i}(res_i, t) = \sum_{k=1}^{N_t} \lambda'_k |e_t^T(t) \cdot (r'_{tx,k} \odot res_i)|^2$$

with $\lambda_k$ scalars and $r_{tx,k}$ vectors depending of the chosen convolution kernel $f_n$.

FIG. 9 represents the variation of this modified function $f_{mod\_i}$ as a function of the different possible values of the variable t. The modified function $f_{mod\_i}$ here has the shape of a parabola centered on the value t associated with the searched angle of departure.

A conventional optimization method is hence applied to this modified function $f_{mod\_i}$. The Newton-Raphson method is here applied, decomposed into the following steps E34 to E44. The object of this method is to determine the position of the maximum of the modified function $f_{mod\_i}$.

As shown in FIG. 6, the estimation method Est continues with step E34 of initializing an index l to the value 0. This index l denotes the current run of this optimization method. During this step, the control unit 2 also initializes the value of a variable $t^l$. Here, the first estimation $t^0$ determined at step E30 is used as the initialization value.

At step E36, the processor of the estimation device determines, for the current run, the values of the first and second derivatives of the modified function $f_{mod\_i}$ as the value of the current variable $t^l$. In other words, using the conventional notations, the processor of the estimation device determines the values $f_{mod\_i}'(z, t^l)$ and $f_{mod\_i}''(z, t^l)$.

Then, at step E38, the processor of the estimation device determines the value of the variable $t^{l+1}$ defined by the following expression:

$$t^{l+1} = t^l - \frac{f'_{mod}(z, t^l)}{f''_{mod}(z, t^l)}$$

The method thus continues with step E40 during which the processor of the estimation device evaluates if the determined value $t^{l+1}$ corresponds to the maximum of the modified function $f_{mod\_i}$. For that purpose, the processor calculates the quantity $[t^{l+1} - t^l]$. If this quantity is higher than a predetermined value $\varepsilon(|t^{l+1} - t^l| > \varepsilon)$, it cannot be considered that the convergence towards the maximum is reached.

The method then continues with step E42 during which the value $t^l$ is actualized by the value $t^{l+1}$ determined at step E38. The index l is also incremented. A new iteration is then implemented and the method restarts at step E36.

On the other hand, if, at step E40, the quantity $|t^{l+1} - t^l|$ is lower than the predetermined value $\varepsilon(|t^{l+1} - t^l| < \varepsilon)$, the determined value $t^{l+1}$ can be considered as representing the value of the maximum of the modified function $f_{mod\_i}$ (step E44).

In other words, this value $t^{i+1}$ corresponds to a finer estimation of the value t associated with the searched angle of departure $\theta_{tx}$.

In the example of a parabolic convolution kernel, a single iteration is sufficient to reach the value of the maximum with the Newton-Raphson method.

As an alternative, other optimization methods can be used such as, for example, the gradient descent.

Here, the value associated with the angle of departure, obtained at this step, is denoted $T_p$.

Once obtained the estimation of the value $T_p$ associated with the angle of departure, the channel estimation method then continues with step E50 (FIG. 3).

From the obtained estimation of the value t associated with the direction of departure, the parameter $\beta_{p,i}$ representing the gain estimation of the electromagnetic signals associated with the estimation $T_p$ of the value t obtained by the estimation derived from the current iteration i of the method is determined. More precisely, the determination thereof is based on the calculation of a pseudo-inverse. Indeed, using a matrix notation, the propagation channel h is written: $h = E_t \cdot b$ with $E_t$ the matrix containing the steering vectors $e_t$ and b the matrix associated with the gain estimations $\beta_{p,i}$.

The determination of the matrix b associated with the gain estimations $\beta_p$ (and hence the gain estimations $\beta_{p,i}$ themselves) then uses a pseudo-inversion according to the following formula: $b = (E_t^H \cdot E_t)^{-1} \cdot E_t^H h$.

This parameter $\beta_{p,i}$ is here recalculated at each iteration of the method for all the values p lower than or equal to the current index i.

The signal detected is then fully characterized and the method is continued by actualizing the value of the residue $res_i$ previously introduced (step E52) to take into account the last signal detected and the estimation associated with the corresponding angle of departure. In other words, the signal, among the signals remaining in the residue, whose power was the highest, is deduced from the noisy values z to obtain a new residue $res_{i+1}$:

$$res_{i+1} = z - \sum_{p=1}^{P} \beta_{p,i} e_t(\tau_p)$$

The new residue $res_{i+1}$ is completely recalculated from the noisy values z at each iteration because the gain estimations $\beta_{p,i}$ are actualized at each iteration.

The index i is then incremented at step E54 and the method then restarts before the detection method Det, as long as the stop condition defined at step E20 is not obtained.

These estimated values are used, in a context of demodulation, in order to remove the propagation channel influence in the data.

These estimated values can also be used by the control unit 2 to configure circuits for processing the electromagnetic signals received by the antennas $R_1, \ldots, R_{Nr}$ of the array of antennas (these processing circuits being included in the control unit 2 but not shown so as to simplify the disclosure). These estimated values can also be estimated to configure pre-encoders adapted to perform a pre-encoding of the electromagnetic signals to be transmitted by means of the antennas $R_1, \ldots, R_{Nr}$ of the array of antennas (when these antennas also operate in transmission as mentioned hereinabove).

Annex: Demonstration of Formula (1)

The present invention includes a step of detecting a ray whose parameters (here the variable t associated with the direction of departure $\theta_{tx}$) are unknown, based on the samples received:

$y = X_t^T h + n$ with $h = \beta \cdot e_t^*(t)$.

Then, the distribution of y knowing the direction of departure t is given by:

$$p(y|t) = \frac{1}{(2\pi\sigma_n^2)^{N_t}} e^{\frac{|\beta|^2 |y^H X_t^T e_t^*(t)|^2}{\sigma_n^2}}$$

The direction of departure belongs to the range $[-1, 1]$. This range is divided into a succession of sub-ranges. The probability of presence of the ray in each sub-range is tested. The probability of presence of the ray in the range $$\left[\bar{t} - \frac{\Delta t}{2}, \bar{t} + \frac{\Delta t}{2}\right]$$

is given by:

$$P\left(\bar{t} - \frac{\Delta t}{2} < t < \bar{t} + \frac{\Delta t}{2}\right) = \int_{\bar{t}-\frac{\Delta t}{2}}^{\bar{t}+\frac{\Delta t}{2}} p(y|t) dt$$

Generally, the following formula will be calculated $$\int_{\bar{t}-\frac{\Delta t}{2}}^{\bar{t}+\frac{\Delta t}{2}} p(y|t) dt = \int_{-\infty}^{\infty} g(t-\bar{t}) p(y|t) dt \text{ with } g(t) = \begin{cases} 1 \text{ if } t \in \left[-\frac{\Delta t}{2}, \frac{\Delta t}{2}\right] \\ 0 \text{ else} \end{cases}$$

This probability can be rewritten as:

$$P\left(\bar{t} - \frac{\Delta t}{2} < t < \bar{t} + \frac{\Delta t}{2}\right) = \frac{1}{(2\pi\sigma_n^2)^{N_t}} \int_{-\infty}^{\infty} g(t-\bar{t}) e^{\frac{|\beta|^2 |y^H X_t^T e_t^*(t)|^2}{\sigma_n^2}} dt.$$

A first-order series expansion of the exponential near 0 is performed: $e_x \approx 1 + x$. The probability is now rewritten with introduction of constants $K_0$ and $K_1$ as:

$$P\left(\bar{t} - \frac{\Delta t}{2} < t < \bar{t} + \frac{\Delta t}{2}\right) \approx K_0 + K_1 \int_{-\infty}^{\infty} g(t-\bar{t}) |y^H X_t^T e_t^*(t)|^2 dt$$

We denote:

$z = X_t^H y$

Then the integral can be rewritten as:

$$\int_{-\infty}^{\infty} f(t-\bar{t}) |y^H X_t^T e_t^*(t)|^2 dt =$$

$$\int_{-\infty}^{\infty} g(t-\bar{t}) |z^H e_t^*(t)|^2 dt = \sum_{k,l=0}^{N_t-1} [z]_k [z]_l \int_{-\infty}^{\infty} g(t-\bar{t}) e^{2\pi j \frac{(l-k)|a|t}{\lambda}} dt$$

where |a| represents the distance between two antennas and λ represents the wavelength associated with the frequency of the carrier used. It can be observed that the integral involves the Fourier transform of the kernel function g(t), called $$\Phi_g\left(\frac{(l-k)|a|}{\lambda}\right)$$

The ray presence probability can be written:

$$P\left(\bar{t}-\frac{\Delta t}{2}<t<\bar{t}+\frac{\Delta t}{2}\right) \approx K_0 + K_1 z^H \Delta^H(\bar{t}) R_0 \Delta(\bar{t}) z$$

where $$\Delta(\bar{t}) = \text{diag}(e_t(\bar{t}))$$

and $$[R_0]_{k,l} = \Phi_f\left(\frac{(l-k)|a|}{\lambda}\right)$$

In the case presented here, where $$g(t) = \begin{cases} 1 & \text{if } t \in \left[-\frac{\Delta t}{2}, \frac{\Delta t}{2}\right] \\ 0 & \text{else} \end{cases}$$

we have:

$$[R_0]_{k,l} = \Delta t \; \text{sinc}\left(2\pi\Delta_t(l-k)\frac{\|\vec{a}_{tx}\|}{\lambda}\right)$$

For each sub-range j, of size $\Delta_t$ and centered on $t_j$, let's:

$$f(z,j) = z^H \Delta^H(t_j) R_0 \Delta(t_j) z$$

be the part depending on z of the probability of presence of the ray in the range j.

The matrix $R_0$ can be decomposed into eigenvectors and eigenvalues as follows:

$$R_0 = \sum_{k=0}^{N_t-1} \lambda_k r_{tx,k}^H r_{tx,k}$$

so that the function $f_t(z, j)$ can be written as $$f(z,j) = \sum_{k=0}^{N_t-1} \lambda_k \left| e_t^T(\bar{t}_j) \cdot (r_{tx,k} \odot z) \right|$$

During the phase of detection, the ray presence probability $P_j$ for each range j is calculated:

$$P_j = P\left(\bar{t}_j - \frac{\Delta t}{2} < t < \bar{t}_j + \frac{\Delta t}{2}\right)$$

The sub-range the most liable to contain the ray is then sought. This operation amounts to retain the sub-range having shown the maximum probability. For that purpose, the complete calculation of $P_j$ is not necessary, it is sufficient to calculate $f_t(z, j)$, the variable part of $P_j$. The value reached by f(z, j) in the sub-range retained is tested with respect to a threshold. The decision of the detection method is given by the test result.

The invention claimed is:

1. A method for detecting a signal in a communication system including a plurality of communication channels, from a plurality of noisy values respectively representative of the transmission through said communication channels, propagation in said communication channels being characterized by at least one variable, a set of values able to be taken by said at least one variable being divided into a plurality of ranges, said method comprising:
   receiving signals respectively transmitted in the plurality of communication channels; and
   detecting a signal corresponding to a value of said at least one variable included in one range among the plurality of ranges by comparing, with a predetermined threshold, a value taken by a correlator linked to the one range and calculated as a function of the noisy values, the detecting the signal comprising determining, for each of the ranges, a sum of windowed correlator functions associated with the respective range and depending upon said noisy values.

2. The detection method according to claim 1, wherein the detecting comprises comparing, with said predetermined threshold, a maximum value among a plurality of values taken by the correlator.

3. The detection method according to claim 1, wherein the detecting comprises comparing the sum of windowed correlator functions with said predetermined threshold.

4. The detection method according to claim 1, wherein the predetermined threshold depends upon a level of noise associated with the one range.

5. A method for channel estimation in a communication system including a plurality of communication channels, from a plurality of noisy values respectively representative of the transmission through said communication channels, said method comprising:
   detecting a signal by implementing the detection method according to claim 1; and
   estimating the value of the at least one variable in the range including the value of said variable corresponding to the detected signal.

6. A method for channel estimation in a communication system including a plurality of communication channels, from a plurality of noisy values respectively representative of the transmission through said communication channels, said method comprising, while a stop condition is not obtained, repeatedly:
   detecting a signal by implementing the detection method according to claim 1; and
   estimating the value of the at least one variable in the range including the value of said at least one variable corresponding to the detected signal,
   wherein said stop condition corresponds to an absence of detection of the signal when the detection method is implemented.

7. The estimation method according to claim 5, wherein the estimating comprises determining an intermediate value of said at least one variable as equal to the center of the range including the value of said at least one variable corresponding to the detected signal.

8. The estimation method according to claim 6, wherein the estimating comprises determining a function having a property of convexity associated with a scalar product of a vector formed of the noisy values and a steering vector depending upon said at least one variable, the maximum of said function having a property of convexity and the maximum of said scalar product being obtained for the same value of said variable.

9. A non-transitory computer-readable medium on which is stored a computer program comprising instructions executable by a processor and configured to implement the method according to claim 1 when the instructions are executed by the processor.

10. The estimation method according to claim 6, wherein the estimating comprises determining an intermediate value of said variable as equal to the center of the range including the value of said variable corresponding to the detected signal.

11. The estimation method according to claim 6, wherein the estimating comprises determining an intermediate value of said variable by comparing correlators corresponding to the range including the value of said variable corresponding to the detected signal.

12. The estimation method according to claim 10, wherein the estimating further comprises determining a function having a property of convexity associated with a scalar product of a vector formed of the noisy values and a steering vector depending upon said variable, the maximum of said function having a property of convexity and the maximum of said scalar product being obtained for the same value of said variable.

13. The estimation method according to claim 11, wherein the estimating further comprises determining a function having a property of convexity associated with a scalar product of a vector formed of the noisy values and a steering vector depending upon said variable, the maximum of said function having a property of convexity and the maximum of said scalar product being obtained for the same value of said variable.

14. The estimation method according to claim 11, wherein said value of the variable is determined by an optimization operation based on said intermediate value of the variable and using said function having the property of convexity.

15. The estimation method according to claim 12, wherein said value of the variable is determined by an optimization operation based on said intermediate value of the variable and using said function having the property of convexity.

16. A method for channel estimation in a communication system including a plurality of communication channels, from a plurality of noisy values respectively representative of the transmission through said communication channels, propagation in said communication channels being characterized by at least one variable, a set of values able to be taken by said at least one variable being divided into a plurality of ranges, said method comprising:

receiving signals respectively transmitted in the plurality of communication channels;

detecting a signal corresponding to a value of said at least one variable included in one range among the plurality of ranges by comparing, with a predetermined threshold, a value taken by a correlator linked to the one range and calculated as a function of the noisy values; and estimating the value of the at least one variable in the range including the value of said variable corresponding to the detected signal, the estimating comprising determining an intermediate value of said at least one variable by comparing windowed correlators corresponding to the range including the value of said at least one variable corresponding to the detected signal.

17. A signal detector configured to detect a signal in a communication system including a plurality of communication channels, from a plurality of noisy values respectively representative of the transmission through said communication channels, propagation in said communication channels being characterized by at least one variable, a set of values able to be taken by said at least one variable being divided into a plurality of ranges, said signal detector comprising:

one or more processors configured to:
  receive signals respectively transmitted in the plurality of communication channels, and
  detect a signal corresponding to a value of said at least one variable included in one range among the plurality of ranges by determining, for each of the ranges, a sum of windowed correlator functions associated with the respective range and depending upon said noisy values and comparing, with a predetermined threshold, a value taken by a correlator linked to the one range and calculated as a function of the noisy values.

18. A device for channel estimation in a communication system including a plurality of communication channels, from a plurality of noisy values respectively representative of the transmission through said communication channels, said channel estimation device comprising:

the signal detector according to claim 17; and at least one processor configured to estimate the value of the at least one variable in the range including the value of said at least one variable corresponding to the detected signal.

19. A device for channel estimation in a communication system including a plurality of communication channels, from a plurality of noisy values respectively representative of the transmission via said communication channels, said channel estimation device comprising:

the signal detector according to claim 17; and at least one processor configured to estimate the value of the at least one variable in the range including the value of said at least one variable corresponding to the detected signal, wherein the channel estimation device is configured to activate the signal detector and the at least one processor, while a stop condition is not obtained, said stop condition corresponding to an absence of detection of the signal by the signal detector.

* * * * *